J. J. Carrel,
Harness Trimming,
Nº 5,860.
Patented Oct. 17, 1848.

UNITED STATES PATENT OFFICE.

JOHN J. CARREL, OF PETERSBURG, VIRGINIA.

HARNESS-SADDLE MOUNTING.

Specification of Letters Patent No. 5,860, dated October 17, 1848.

*To all whom it may concern:*

Be it known that I, JOHN JOSEPH CARREL, of Petersburg, in the county of Dinwiddie and State of Virginia have invented certain Improvements in Harness-Mountings, and that the following is a full, clear, and exact description of the principle or character which distinguishes them from all other things before known and of the usual manner of making, modifying, and using the same, reference being had to the accompanying drawing, which forms a part thereof, in which—

Figure 1:
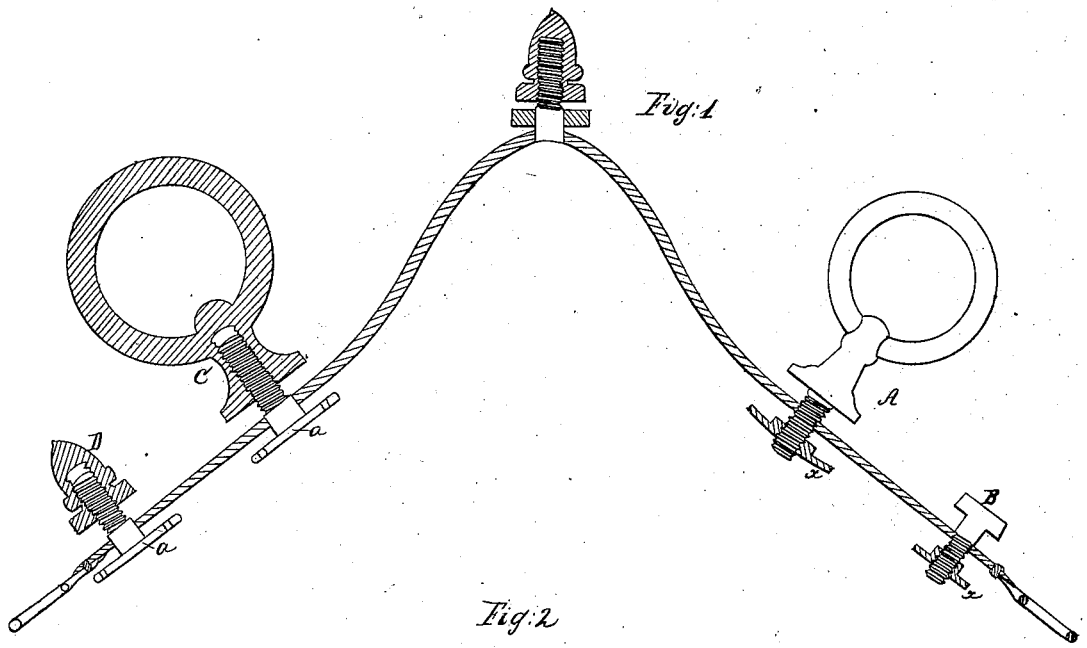
Figure 2:
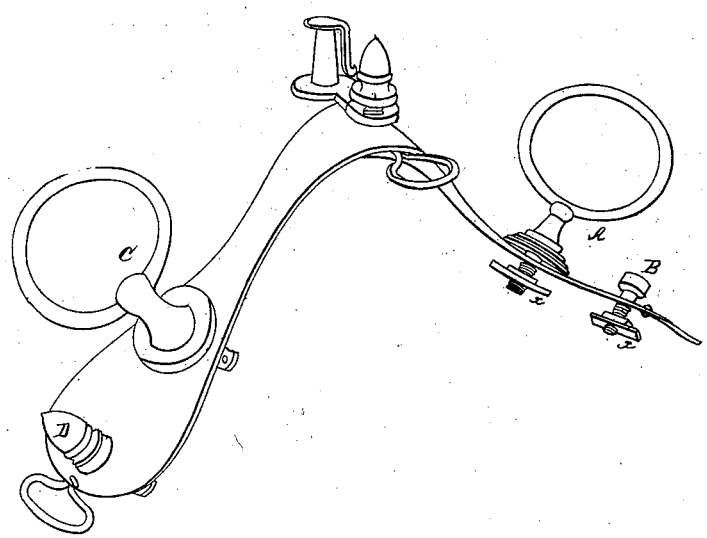

Figure 1, is a section through the turret, &c. Fig. 2 is a view of the parts.

The nature of my improvement consists in the method of constructing and attaching the water hooks, turrets, and screws, that are used on harness saddles, in such a manner as to prevent their injuring the horse's back, and at the same time strengthening the parts without increasing their number or cost materially, the beauty of the mountings being thereby incidentally increased.

The difference between the old style of mounting and my improved method clearly appears on an inspection of the drawing, where both are represented A being a turret in the old style, and B, a screw.

It will be seen that there is a shank to these extending through the plates, from the outside inward, with the thread of a screw cut thereon; this screw enters a nut (*x*) attached to the under side of the pad, and holds the pad in position; but if the end of the screw projects, as is apt to be the case as the pad reduces in thickness by wear, &c., there is a risk of the horse's back being galled thereby; and inasmuch as the nut must necessarily be thin, there is very little hold for the screw, covering only two or three turns of the thread; this is apt to wear out, and it is a common complaint that these screws are worn out long before the harness to which they are affixed. I obviate these difficulties by reversing the screw and nut; I attach the male screw to a plate (*a*) which is affixed to the pad, and is all smooth below, and enlarge the shank of the turret sufficiently to form a female screw therein, as clearly shown at C, Fig. 1; this may have a thread an inch or more in length, and will receive the screw into it that distance without danger of injury to the horse, and allowing a much stronger connection between the screw and nut, without disfiguring the turret. The screw D is also similarly arranged, and the cap or nut covering the threads of the screw entirely, and forming an ornament, such as an acorn, shown in the drawing or other device.

Having thus fully described my improved mounting I wish it to be distinctly understood, that I do not claim merely reversing the screws, but

What I do claim is—

The method herein described of connecting the turrets, water hooks and screws with the harness saddle by forming the female screw in the shanks of the turrets and water hook and passing the male screw up from below into them, by which greater length of screw and strength is attained, and the liability of injuring the horse avoided; there can also be a saving of materials in the pad, and of labor in manufacturing.

JOHN JOSEPH CARREL.

Witnesses:
J. J. GREENOUGH,
WM. GREENOUGH.